Patented Apr. 16, 1940

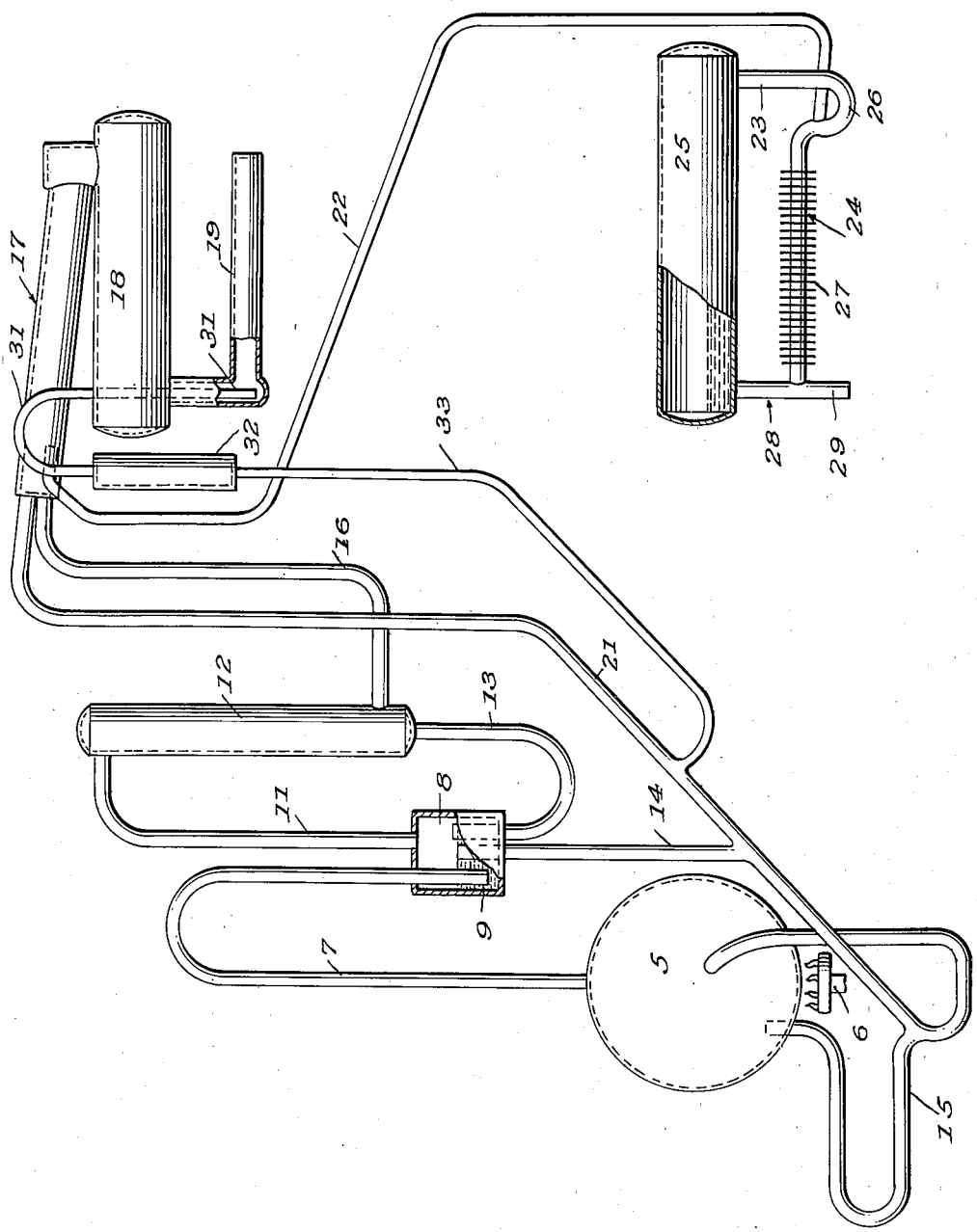

2,197,303

UNITED STATES PATENT OFFICE 2,197,303

ABSORPTION CYCLE REFRIGERATOR SYSTEM

Walter J. Guzik, Cleveland, Ohio

Application December 23, 1938, Serial No. 247,509

5 Claims. (Cl. 62—118)

This invention relates to improvements in condensers and, more especially to condensers used in intermittent absorption refrigerating systems, using a dead end circuit, the condenser being the dead end of the circuit.

This application is a continuation in part of application Serial No. 72,611, filed April 3, 1936, which was a division of application Serial No. 718,051, filed March 29, 1934, for which Patent No. 2,108,360 issued February 15, 1938, in the name of E. E. Allyne et al.

In a dead end absorption refrigerating system, the generator absorber generates vapor in the form of aqua ammonia vapor, by means of external heat supplied to the generator absorber.

The vapor is forced under pressure, i. e., in generating the vapor a pressure is set up in the generator, to a rectifier where the major portion of the water in the vapor is removed therefrom and returned to the generator absorber. The ammonia vapor continues to the evaporator and, thence, to the condenser unit, where it is stored in a condenser receiver, building up a pressure in the condenser unit and above the condensed liquor. At the end of the heating period or cycle, pressure is no longer generated in the still or generator absorber, and the built up pressure in the condenser unit forces the ammonia liquor back to the evaporator where it is deposited in the evaporator. During the refrigerating cycle the heat of the refrigerator compartment is absorbed by the ammonia liquor in the freezing coils, boiling the ammonia liquor, and returned in the form of vapor from the freezing coils to the evaporator and, thence, back to the generator absorber.

In a system of this type, it is of the utmost importance that the ammonia vapor be condensed as rapidly as possible, in order to maintain a synchronized balance between the generator absorber and the condenser unit. It is obvious, therefore, that a highly efficient condenser unit must be used.

It has been the practice in the past to provide a condenser unit, having a condenser receiver and a series of coils associated therewith, or other suitable means of heat transfer, the condenser unit being surrounded, or immersed in a liquid heat transfer means, such as impounded water, or running water.

Where an impounded liquid is used as the heat transfer agent, the volume of liquid necessary for efficient condensing requires an extremely large surface area in order to carry off the heat of the condenser. Where the area is restricted, heat units are added more rapidly than the liquid transfer means can dissipate them. The result is extremely inefficient operation of the system, due mainly to the impounded heat retained by the liquid.

A moving, or flowing liquid, such as running water, is also objectionable, due to the high initial cost of installation, requiring piping from the water supply and a return line for drainage, as well as to the variable temperature of the running water. The added expense of running water is also objectionable and prevents sales to homes having no running water.

An object, therefore, of the present invention is to overcome these drawbacks by providing a condenser system which eliminates the use of a liquid cooling medium, or liquid as a heat transfer agent.

A further object of the present invention is to provide a condenser system wherein the vapor is condensed and the hot condensate is circulated through special cooling means, the cooled liquor being then conveyed to suitable storage means.

Still a further object is to provide a condenser and liquor circulatory cooling means with efficient air cooled surfaces to rapidly transfer the heat units contained in the vapor and ammonia liquor to the atmosphere.

Another object is to provide a condenser receiver having a vapor circulatory means below the condenser receiver and in open communication therewith.

A further object is to provide a condenser and storage unit having a liquor circulatory means in open communication therewith.

The manner of accomplishing these and other objects of the invention will be more apparent in view of the following description when considered in connection with the accompanying drawing.

The drawing is a diagrammatic illustration partly in section of an embodiment of the invention as applied to an intermittent absorption refrigerating system in which the condenser receiver and liquid circulatory coil form a part.

In describing the invention, it will be assumed that a binary mixture consisting of ammonia and water is used in correct proportions, although the invention is not limited to the use of these fluids, as any suitable agents may be used.

The generator absorber 5 contains a charge of aqua ammonia. This charge is heated by any suitable ignition means such as a gas burner 6. The generator vapor is conducted through conduit 7 to a water seal trap 8 where the outlet portion of the conduit is carried adjacent to the bottom portion of the trap and immersed in water 9. The vapor or gas is forced through the water and out of the trap through conduit 11, and into rectifier 12, preferably at the top thereof, the major portion of the water contained in the vapor being separated therein and returned to the trap 8 through conduit 13, overflowing therein into conduit 14, the opening of said conduit extending intermediate the top and bottom of the trap, and the water flowing through conduit 14 to the generator absorber circulatory loop 15. The vapor continues under the pressure generated in the generator absorber through conduit 16 to an evaporator receiver tube 17, this tube being in open communication with an evaporator 18, into which the vapor is forced.

Freezing tubes 19 are also in open communication with the evaporator, and the vapor is likewise forced into these tubes. As soon as vapor pressure is built up in the freezing tubes, the evaporator and the evaporator receiver tube, the said vapor is forced into conduit 21 where it encounters a liquid seal at about the level of the liquid in the generator absorber. Vapor also continues through conduit 22 which enters a down leg 23 of a condenser receiver circulatory loop 24 in circuit with a condenser receiver 25. It will be noted that conduit 22 is bent upward adjacent to its connection to the condenser receiver circulatory loop 24 and that the down leg 23 includes a U-shaped section of conduit 26, the conduit 22 being connected to the leg thereof which is farther from the condenser receiver 25. The circulatory loop 24 is in closed fluid communication with the condenser-receiver 25, and, preferably, below the same.

A series of fins 27 are associated with the circulatory loop 24 in order to increase its radiating surface.

As shown in the drawing, the circulatory loop 24 has an up leg 28 which preferably opens into the bottom of the condenser receiver 25. The leg 28 is extended below the circulatory loop 24 to provide a sump 29. In this embodiment of the invention the coil or circulatory loop 24 performs all of the condensing, except for that accomplished in the condenser receiver 25.

The condensate fills the loop 24, including the U-shaped section 26, and flows towards the up leg 28 whence it enters the condenser receiver 25 for storage. Throughout the period in which heat is applied to the generator absorber 5, namely, the heating cycle, there will be a circulation through the loop.

At the conclusion of the heating cycle, the heat is removed from the generator absorber 5 and the refrigerating cycle starts. Ammonia liquor is now stored in the circulatory loop 24 and in a portion of the condenser receiver. It is obvious that the condenser receiver must be of larger capacity than the total amount of ammonia liquor introduced into the system in the form of the initial charge.

An ammonia pressure is built up in the unfilled portion of the condenser receiver 25. This ammonia pressure forces the ammonia liquor up conduit 22, entering evaporator receiver 17 and flowing down and into the evaporator and freezing tubes.

During the refrigerating cycle the heat in the refrigerator is carried off through the boiling of the ammonia liquor in the freezing tubes 19 in the form of vapor, which passes to the evaporator 18; thence to the evaporator receiver tube 17 and down through conduit 21 into the water return conduit 14. Finally, it flows through the still absorber circulatory loop 15 and back into the still absorber 5.

A drain conduit 31 enters a leg of the freezing tubes 19, and has its opening adjacent the bottom thereof. The drain conduit 31 then continues up the leg of the freezing tubes, through the evaporator 18 and to a point higher than the highest point of the evaporator receiving tube 17. From this point it turns downward and enters an enlarged portion 32; a conduit 33 is attached to the portion 33 and continues downward, bending slightly where it enters conduit 21 at a point near the level of the liquid in the generator absorber 5.

The drain occurs only during the early portion of the heating cycle. As soon as a slight pressure is created in the system by the generator absorber, the pressure in the drain equalizes with the system and the drain ceases. The function of the drain is to remove any trace of water in the freezing tubes, which would materially reduce the efficiency of the system.

When the condenser receiver 25 contains enough liquor to cover the ends of the circulatory coil, a circulation of the liquor is set up by means of the pressure of the vapor received through conduit 22.

It will be understood that actual circulation through the condenser receiver 25 starts only after the gas has begun to condense and drop by gravity into the sump at the U-shaped section 26 where it forms a liquid seal. Prior to that time the gas permeates the unit until a condensing pressure is reached.

What I claim is:

1. In an absorption cycle refrigerating apparatus, a still absorber, an evaporator, and a condenser unit operatively connected in the order named, the said condenser unit consisting of a condenser receiver, and a circulatory conduit below the said receiver and in closed fluid communication therewith, and means to induce flow in said circulatory loop during the generating portion of the absorption cycle.

2. In an absorption cycle refrigerating apparatus, a still absorber, an evaporator, and an air-cooled condenser unit operatively connected in the order named, the said condenser unit consisting of a receiver wherein the vapor created in the still absorber is forced under pressure and a circulatory cooling coil below the receiver and in closed fluid communication therewith.

3. The method of refrigerating by the intermittent absorption cycle which includes the steps of generating a vapor, progressively condensing the said vapor, circulating and recirculating the condensate so formed by means of the oncoming vapor to be condensed, and thereafter evaporating said condensate.

4. In an absorption cycle refrigerating apparatus, a still-absorber, an evaporator, and a condenser unit operatively connected in the order named, the said condenser unit consisting of a condenser receiver and a closed circuit condensing loop connected thereto, wherein the vapor generated in the still-absorber is forced under pressure after passing through the evaporator and thereafter continuously circulates during the heating period, the condensate formed being circulated through the said receiver and loop during the heating period of the refrigerating cycle until all of the vapor is condensed.

5. The method of refrigeration by the intermittent absorption cycle which includes generating a gas by application of heat to a liquid body in which said gas is absorbed, progressively condensing said gas by flowing it in heat exchange relation to the atmosphere, collecting the condensate thus formed, flowing said condensate in heat exchange relation to the atmosphere, flowing additional generated gas through the condensate to maintain a constant circulation and recirculation thereof during the heating period of the refrigeration cycle until the gas is liquefied, and thereafter evaporating said condensate.

WALTER J. GUZIK.